W. COOPER.
REFRIGERATING APPARATUS.
APPLICATION FILED JUNE 7, 1912.
1,085,111.
Patented Jan. 27, 1914.
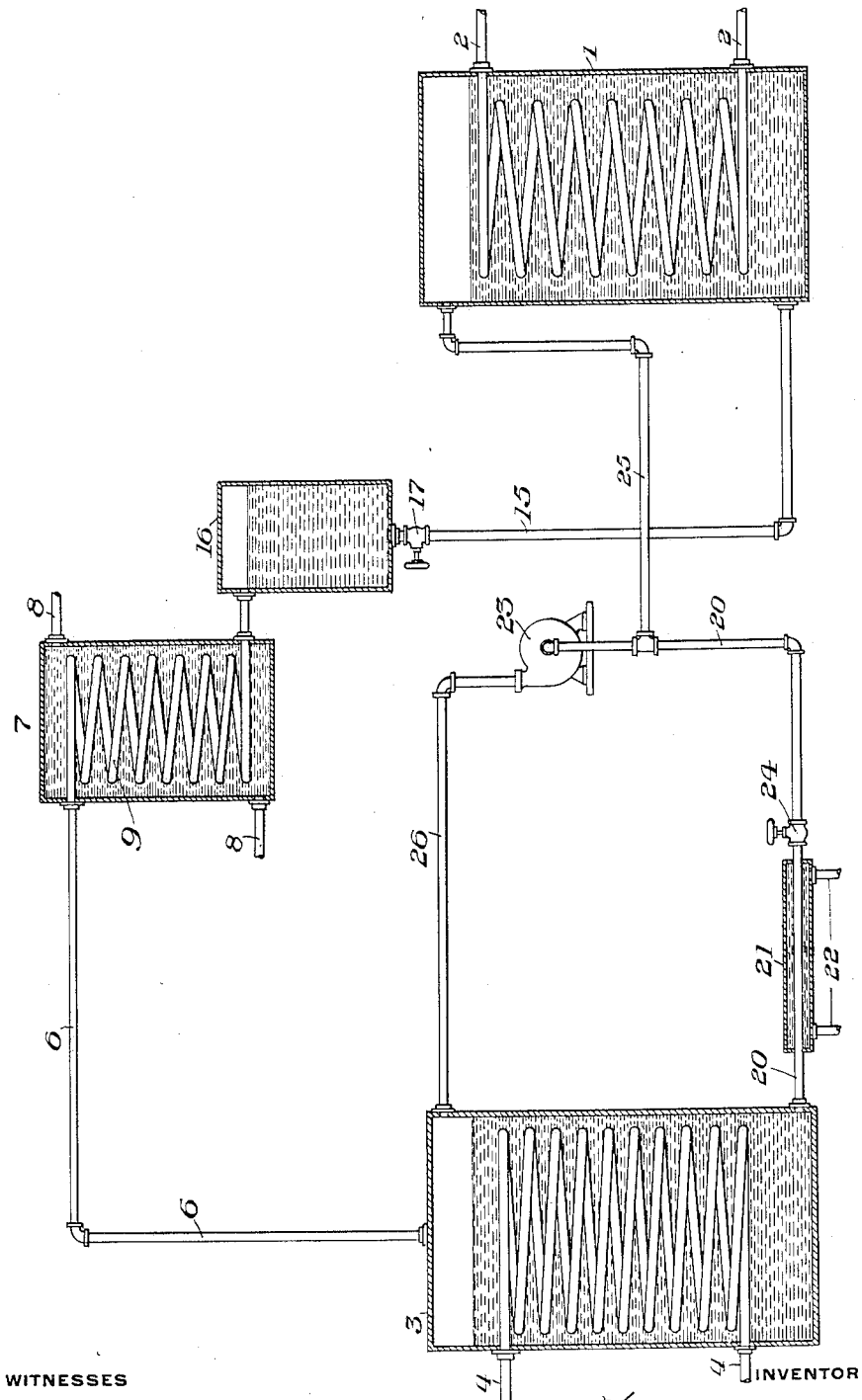
WITNESSES
INVENTOR
William Cooper,
By Fred'k N. White
Attorney

UNITED STATES PATENT OFFICE.

WILLIAM COOPER, OF WILKINSBURG, PENNSYLVANIA.

REFRIGERATING APPARATUS.

1,085,111.   Specification of Letters Patent.   Patented Jan. 27, 1914.

Application filed June 7, 1912. Serial No. 702,297.

*To all whom it may concern:*

Be it known that I, WILLIAM COOPER, a resident of Wilkinsburg, in the county of Allegheny and State of Pennsylvania, have invented a new and useful Improvement in Refrigerating Apparatus, of which the following is a specification.

This invention relates to refrigerating systems, and more especially to systems of the absorption type.

The object of the invention is to produce a simple and inexpensive system, wherein a given amount of refrigeration can be produced at a relatively low cost, or in other words, one having a high efficiency.

In my improved apparatus, the gas returning from the evaporating device is conducted to suitable means which compresses it while in contact with the weak solution coming from the generator and is thereby absorbed therein, the resulting strong solution being thereby raised to approximately the temperature and pressure of the generator. This arrangement enables the production and use of a solution of comparatively high strength, but the invention is not limited by the strength of the solution. Preferably, an aqua solution of ammonia is used in the apparatus, and in the detailed description hereinafter the apparatus is described as using an aqua solution of ammonia, but it will be understood that the invention is not limited to this particular gas.

The accompanying drawing represents diagrammatically an arrangement of apparatus embodying my invention.

In the drawing, 1 indicates a suitable evaporating device in which liquid or anhydrous ammonia is evaporated to produce the refrigerating effect. This may be of any preferred type, and as shown consists of a tank in which the anhydrous ammonia evaporates around the coils 2 of a brine circulating system, and through which brine or any other non-congealable liquid is passed to enable the refrigerant to be conducted to any desired location.

The ammonia is distilled in a generator 3 by the application of heat from any suitable source as, for example, steam pipes 4, the steam being supplied from any suitable source. The generator or still 3 is filled with aqua solution of ammonia which may be of comparatively high strength, say from 70 to 80 per cent. of ammonia by weight in water. The ammonia gas distilled in the generator 3 passes off through a connection 6 to a condenser 7 of any preferred type, in the present instance being shown as a tank having water connections 8 for passing cooling water therethrough and around the coils 9 through which the ammonia passes.

In the condenser 7 the anhydrous ammonia is cooled and liquefied and it is then passed through a conduit or connection 15 to the evaporating device 1 referred to. In the connection 15 may be placed a suitable storage tank 16 for the liquefied anhydrous ammonia, if desired.

The pressure in the generator 3 in practice is about one hundred and fifty pounds to the square inch, depending upon the temperature of the cooling water used in the condenser. The evaporating device 1 is operated under comparatively low pressure, say about fifteen pounds per square inch. To reduce the pressure of the ammonia as it flows from the condenser 7 to the evaporating device 1, a suitable expansion valve 17, of any preferred type, is placed in the connection 15 between the condenser 7 and evaporating device 1.

The present refrigerating system is of the continuous type and is so arranged that as the ammonia is evaporated in the evaporating device 1, it is combined with weak liquor flowing from the generator 3. The weak liquor flows from the generator 3 through a conduit or connection 20 and then through a suitable cooling device 21, shown as a pipe surrounding the connection 20 and provided with connections 22 for passing cooling water therethrough. The weak liquor is returned to the generator 3 by a pump 23 of any suitable form, but preferably of the rotary or turbine type, and driven by any suitable means, such as a steam engine. A reducing valve 24 is placed in the connection 20 between the generator and the pump 23. The ammonia gas passing off from the evaporating device 1 is led through a connection 25 and is mingled with the weak liquor passing through the pump 23, the combined liquor and gas, now in the form of strong liquor, being returned to the generator 3 by a connection 26 from the pump 23.

The operation of the apparatus is as follows: The pressure in the generator or still 3, as stated, is high, say about one hundred and fifty pounds to the square inch, while that in the evaporating device 1 is low, and about fifteen pounds per square inch. Assuming that the weak solution coming from the generator 3 through the connection 20 is 70 per cent. ammonia by weight and that its temperature is about 140° F., this liquor will be cooled in the cooler 21 to a temperature of say 80° F., depending upon the temperature of the cooling water. As the weak liquor passes through reducing valve 24, its pressure is reduced from one hundred and fifty pounds to fifteen pounds per square inch, that is, to the pressure of the evaporating device. At a temperature of 80° F. and a pressure of fifteen pounds per square inch some of the ammonia gas contained in the solution escapes, since a 70 per cent. solution of aqua ammonia can only be had at fifteen pounds pressure by reduction of the temperature to at least 40° F. The escape of this excess ammonia gas from the solution cools the solution to 40° F., about fifteen per cent. of the ammonia in the solution evaporating to obtain this reduction in temperature. The ammonia gas escaping from the evaporator 1 is at a pressure of about fifteen pounds per square inch. As a result of the connections described, there is led to the pump a mixture of solution of aqua ammonia at 40° F. and unabsorbed ammonia gas, this mixture being supplied jointly by the connections 20 and 25. The pump 23 illustrated is of the turbine type, but may be of any form which will cause an intimate mixture and mingling of the gas and liquor to promote rapid and quick absorption of the gas in the liquor. It gradually raises the pressure of the solution and gas passing therethrough. If it so happens, in the case given, that no ammonia gas is being supplied by the connection 25 from the evaporating device, the free gas coming with the solution through the connection 20 from the generator will all return to the solution when the pressure reaches fifty pounds per square inch, the temperature of the solution then being 80° F. The pump, however, continues to raise the pressure of the solution and with a solution of the strength and pressure stated, considerable additional ammonia gas can be added to bring the pressure and temperature up to the pressure and temperature of the generator. In practice the solution absorbs the ammonia gas which is supplied by the connection 25 from the evaporating device 1. The operation and effect of the pump 23 will, therefore, give a solution of about 78.5 per cent. ammonia by weight at a temperature of say 120° F., the minimum temperature of the generator. The ammonia gas added to the solution is just the amount necessary to increase the temperature of the solution to that of the generator at the pressure existing in the generator.

With a system embodying my invention, a solution of aqua ammonia of such high strength in ammonia by weight may be used that the total quantity of solution to produce a given refrigerating effect is very materially reduced. Also, the stronger the solution, the less heat required to distil a given quantity of gas. The pump 23 causes a very thorough stirring up of the solution passing through and secures intimate contact betwen the unabsorbed gas and the entire body of solution so that the gas readily and quickly enters into solution as the pressure is increased. It acts both as an absorber to cause the ammonia gas to reënter the solution and as a mechanical pump to raise the pressure of the solution from that of the evaporator to that of the generator. It dispenses with an absorber of the type usually employed and with the usual interchanger and materially simplifies the apparatus. The expansion valve 17 and the reducing valve 24 control the pressure in the evaporating system and will be so regulated as to secure the most efficient operation. The operation is carried on continuously and the liquor returned to the generator 3 may be so regulated as to enter the same at approximately the existing temperature and pressure therein.

What I claim is:—

1. In an absorption refrigerating system, the combination of a generator, an evaporator, and a single means having connections to the generator and to the evaporator and arranged to both cause the evaporated refrigerant to be absorbed in the weak solution coming from the generator and to also return the resultant solution to the generator.

2. In an absorption refrigerating system, the combination of a generator, an evaporator, and a single means having connections on one side to the generator and evaporator and on its other side being connected to the generator and arranged to receive the evaporated refrigerant from the evaporator and cause it to be absorbed in the weak solution coming from the generator and compress the same and to also conduct the resultant solution to the generator.

3. In an absorption refrigerating system, the combination of a generator, an evaporator, a rotary pump having its suction side connected to the generator and evaporator and arranged to receive the weak solution and evaporated refrigerant and cause the refrigerant to be absorbed in the solution, and having its discharge side connected to the generator for conducting the resultant solution thereto.

4. In an absorption refrigerating system, the combination of a generator, an evaporating device, a pump connected to said generator to circulate liquid therethrough, and a connection between said evaporating device and said pump for delivering evaporated refrigerant to said pump.

5. In an absorption refrigerating system, the combination of a generator, an evaporating device, a pump connected on one side with the generator and evaporating device, said pump being arranged to compress evaporated refrigerant coming from said evaporating device and cause it to be absorbed by the weak solution coming from said generator, and a return connection from the other side of said pump to the generator for returning the strong solution thereto.

6. In an absorption refrigerating system, the combination of a generator, an evaporating device, a pump connected on its suction side to said evaporating device and generator, a cooler for the weak solution coming from said generator, and a connection from the discharge side of the pump to the generator for delivering the resultant strong solution thereto.

7. In an absorption refrigerating system, the combination of a generator, a condenser, an evaporating device, an expansion valve between said condenser and evaporating device, a pump arranged to deliver strong solution to said generator, and a connection between said evaporating device and said pump.

8. In an absorption refrigerating system, the combination of a generator, a condenser, an evaporating device, an expansion valve between said condenser and evaporating device, a pump having connection to said generator and arranged to circulate liquid therethrough, a reducing valve in said connection, and a connection between said evaporating device and said pump.

9. In an absorption refrigerating system, the combination of a generator, a condenser, an evaporating device, an expansion valve between said condenser and evaporating device, a pump having connection for circulating liquid through said generator, a reducing valve and a cooler for the weak solution in said connection, and a connection between said evaporating device and said pump.

In testimony whereof, I have hereunto set my hand.

WILLIAM COOPER.

Witnesses:
 ELBERT L. HYDE,
 WILLIAM B. WHARTON.